United States Patent [19]

Shih

[11] Patent Number: 5,808,679
[45] Date of Patent: Sep. 15, 1998

[54] CAMERA LENS ASSEMBLY USING ROTATABLE CONDUCTIVE PLATE CONNECTORS

[75] Inventor: Cader Shih, Kaohsiung, Taiwan

[73] Assignee: Microtek International Inc., Hsinchu, Taiwan

[21] Appl. No.: 709,170

[22] Filed: Sep. 6, 1996

[51] Int. Cl.$^6$ ............................. G02B 13/16; H04N 5/225
[52] U.S. Cl. ......................... 348/335; 348/375; 348/376; 439/21; 439/914
[58] Field of Search ..................................... 348/335, 373, 348/374, 375, 376; 396/427, 529, 535; 439/20, 21, 22, 914

[56] References Cited

U.S. PATENT DOCUMENTS 4,422,699  12/1983  Sakurai et al. ........................ 439/164

*Primary Examiner*—Andrew I. Faile
*Assistant Examiner*—Alicia M. Harrington
*Attorney, Agent, or Firm*—Bacon & Thomas, PLLC

[57] ABSTRACT

A moving mechanism for a camera lens assembly includes a smooth concave face formed in a surface of the camera main body, a slot formed in the concave face, a first cable extending from the shutter assembly and having at least two wires, a rotatable tube surrounding the cable and having an axial groove, a first plate rotatable with the tube and having at least two electrically conductive rings which are respectively connected to the at least two wires of the first cable, and a second plate fixed against rotation relative to the camera main body and having at least two conductive rings connected to two wires of a second cable extending from the camera main body. The slot in the camera main body is in the shape of a cross and the first plate includes a projection that enables the first plate to move in the two directions permitted by the slot while preventing rotation of the first plate relative to the main body so that, in the case of movement in the left-right or forward-backward directions, the projection does not impede movement of the first plate and the tube, first plate, and second plate all move together in the selected direction, while in the case of rotation about the vertical axis, the first plate is prevented from rotation and only the tube and second plate are rotated together, with the shutter assembly and the first plate rotating relative to the second plate.

7 Claims, 5 Drawing Sheets

CAMERA LENS ASSEMBLY USING ROTATABLE CONDUCTIVE PLATE CONNECTORS

BACKGROUND OF THE INVENTION

1. Field of the Invention

This invention relates to a moving mechanism for a camera lens assembly, and in particular to a moving mechanism for a camera lens assembly of the type having an electrical cable extending connecting between the lens assembly and a main body of the camera, the moving mechanism enabling rotation of the lens assembly relative to the main body of the camera without causing entanglement of the electrical cable.

2. Description of Related Art

In a conventional electronic camera, the lens assembly is either stationary or can only be moved a predetermined distance about a single axis. For example, in the conventional electronic camera shown in FIG. 1, the lens assembly 101 can only be partially rotated about a single horizontal axis (the x-axis) extending parallel to the principal plane of the camera, and cannot be rotated about either the second horizontal axis (the y-axis) or the vertical axis (the z-axis).

Limiting movement of the lens assembly to partial rotation about a single horizontal axis prevents entanglement of the cord (not shown) but has the disadvantage that fine adjustment of the lens assembly position cannot be accomplished without adjustment of the camera position, rather than just the lens assembly position, about the remaining two axes. Where a tripod is used, the tripod position must be fine adjusted about the two fixed axes of the lens assembly, making it impossible to use the electronic camera to capture scenes requiring multiple frames and rapid adjustments of position.

SUMMARY OF THE INVENTION

It is accordingly a first objective of the invention to overcome the shortcomings of the conventional electronic camera by providing a moving mechanism which enables the lens assembly to have at least two rotational degrees of freedom.

It is a second objective of the invention to overcome the shortcomings of the conventional electronic camera by providing a moving mechanism which enables a lens assembly to be rotated 360° about one of at least two axes of rotation without entangling the electrical cable extending between the main body of the camera and the lens assembly.

It is a third objective of the invention to overcome the shortcomings of the conventional electronic camera by providing a moving mechanism which enables a lens assembly to have three rotational degrees of freedom, and which enables the lens assembly to be rotated 360° about one of at least two axes of rotation without entangling the electrical cable extending between the main body of the camera and the lens assembly.

These objectives are achieved, in accordance with the principles of a preferred embodiment of the invention by providing a moving mechanism for a camera lens assembly which includes a smooth concave face formed in a surface of the main body of the camera, a slot formed in the smooth concave face, a first cable extending from the lens assembly and having at least two wires therein, a rotatable tube surrounding the first cable, a first plate rotatable with the tube and having at least two electrically conductive rings which are respectively connected to the at least two wires of the first cable, and a second plate fixed against rotation relative to the main body of the camera and having at least two conductive rings connected to two wires of a second cable extending from the main body of the camera, the first and second plates being relatively rotatable and in electrical contact to transmit electrical signals from the wires of the first cable to the wires of the second cable.

In an especially advantageous feature of the preferred embodiment of the invention, the tube through which the first cable extends includes an axial groove and the first plate includes a detent extending radially into a central opening of the first plate to engage sides of the groove and cause the first plate to rotate with the tube, the first plate being held on the tube and pressed against the second plate by a nut threaded onto an end of the tube, a coil spring, and a washer which also includes a detent arranged to engage sides of the axial groove in the tube. Alternatively, the first plate may be held or biased against the second plate by forming at least the conductive rings on the second plate from a resilient material and forming the rings into a wave washer shape.

In another especially advantageous feature of the preferred embodiment of the invention, the slot in the concave surface of the camera main body is in the shape of a cross and the first plate includes a projection that enables the first plate to move in the two directions permitted by the slot while preventing rotation of the first plate relative to the main body such that in the case of movement in the left-right or forward-backward directions, the projection does not impede movement of the first plate and the tube, first plate, and second plate all move together in the selected direction as the lens assembly is moved, while in the case of rotation about the vertical axis, the first plate is prevented from rotation with only the tube and second plate being rotated together with the lens assembly.

DETAILED DESCRIPTION OF THE PREFERRED EMBODIMENTS

Figure 1:
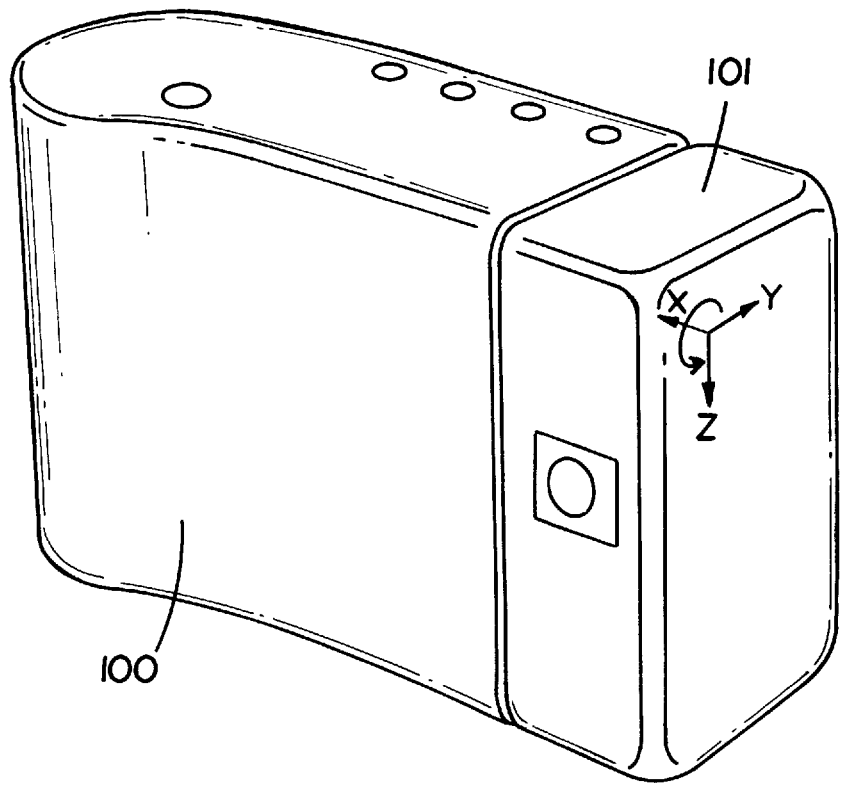
FIG. 1 is a perspective view of a conventional electronic camera.
Figure 2:
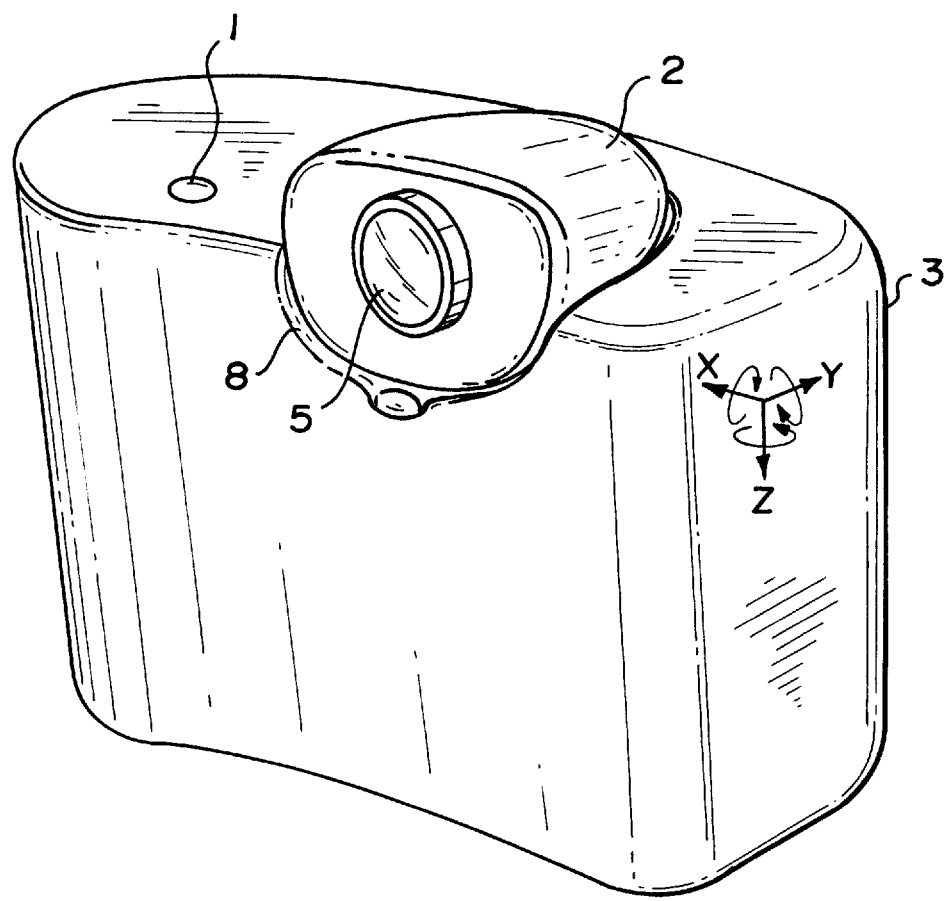
FIG. 2 is a perspective view of an electronic camera employing a lens assembly moving mechanism constructed in accordance with the principles of a preferred embodiment of the invention.

FIG. 2 shows a camera in which has been installed the lens and shutter moving assembly of the preferred embodiment of the invention. The camera of FIG. 2 includes a shutter button 1, a rotatable lens assembly 2 having a lens 5, and a main body 3 having a smooth concave face 8 formed in an upper surface thereof. The smooth concave face 8 on the upper face of the main body supports the lens assembly 2 for two dimensional 360° rotation.

Figure 3:
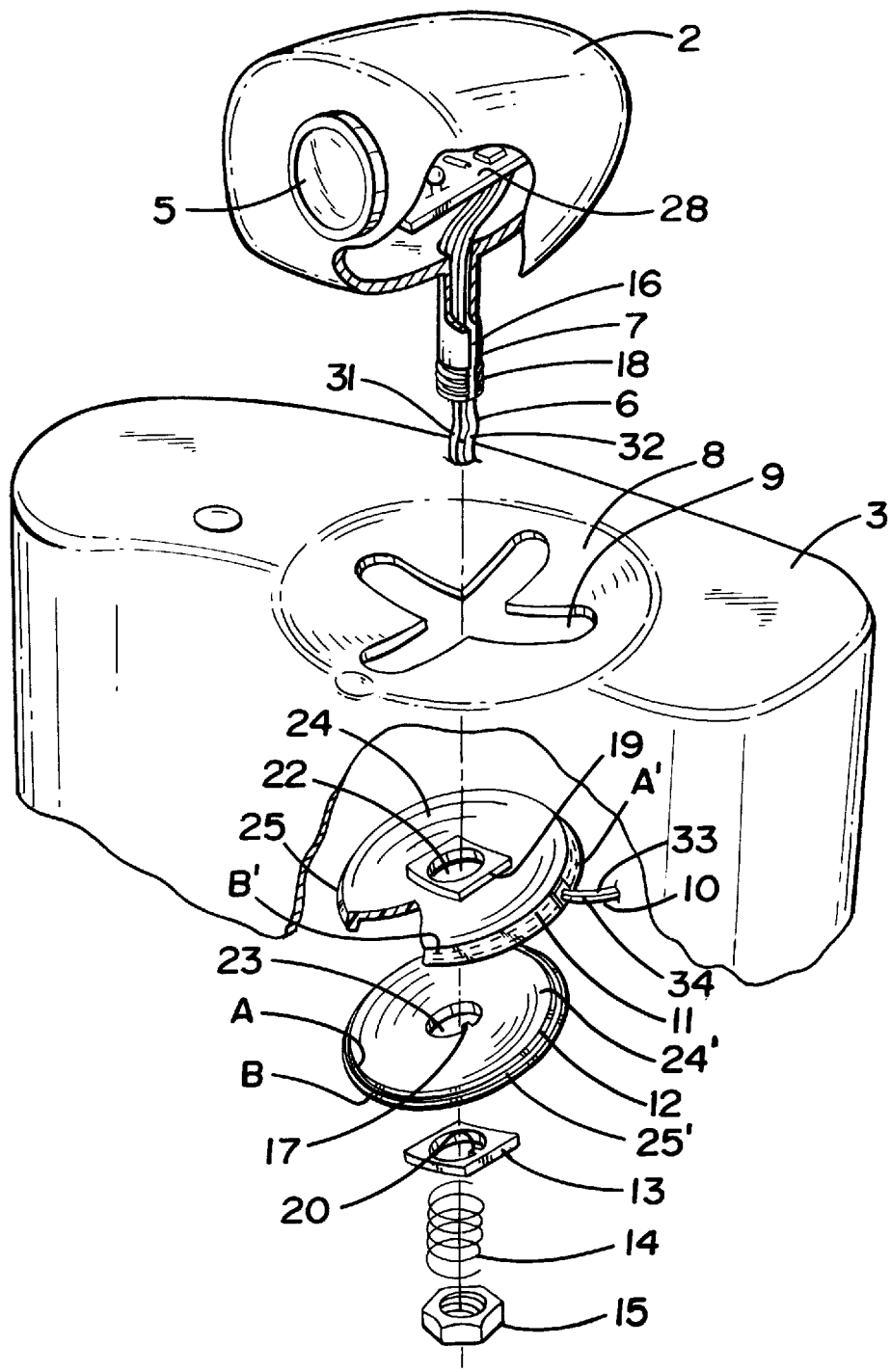
FIG. 3 is an exploded perspective view showing the details of the preferred lens assembly moving mechanism.
Figure 4:
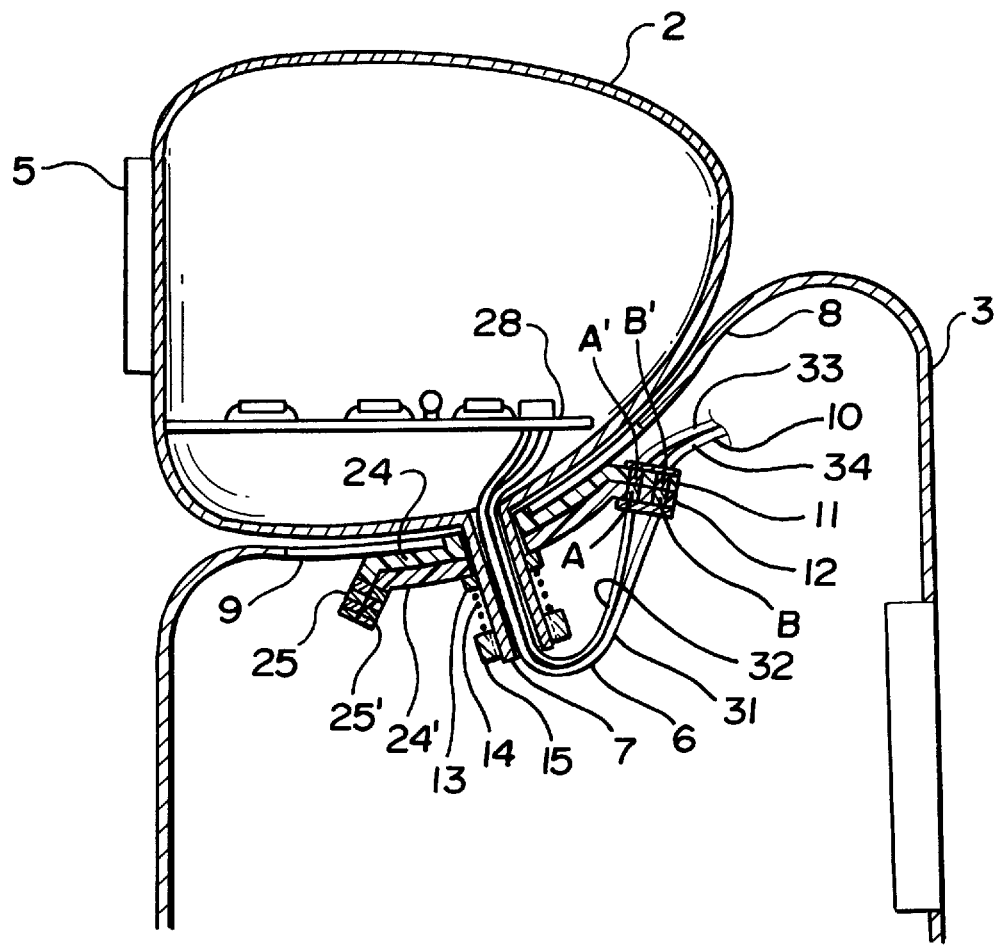
FIG. 4 is a cross-sectional side view of the preferred lens assembly moving mechanism.
Figure 5:
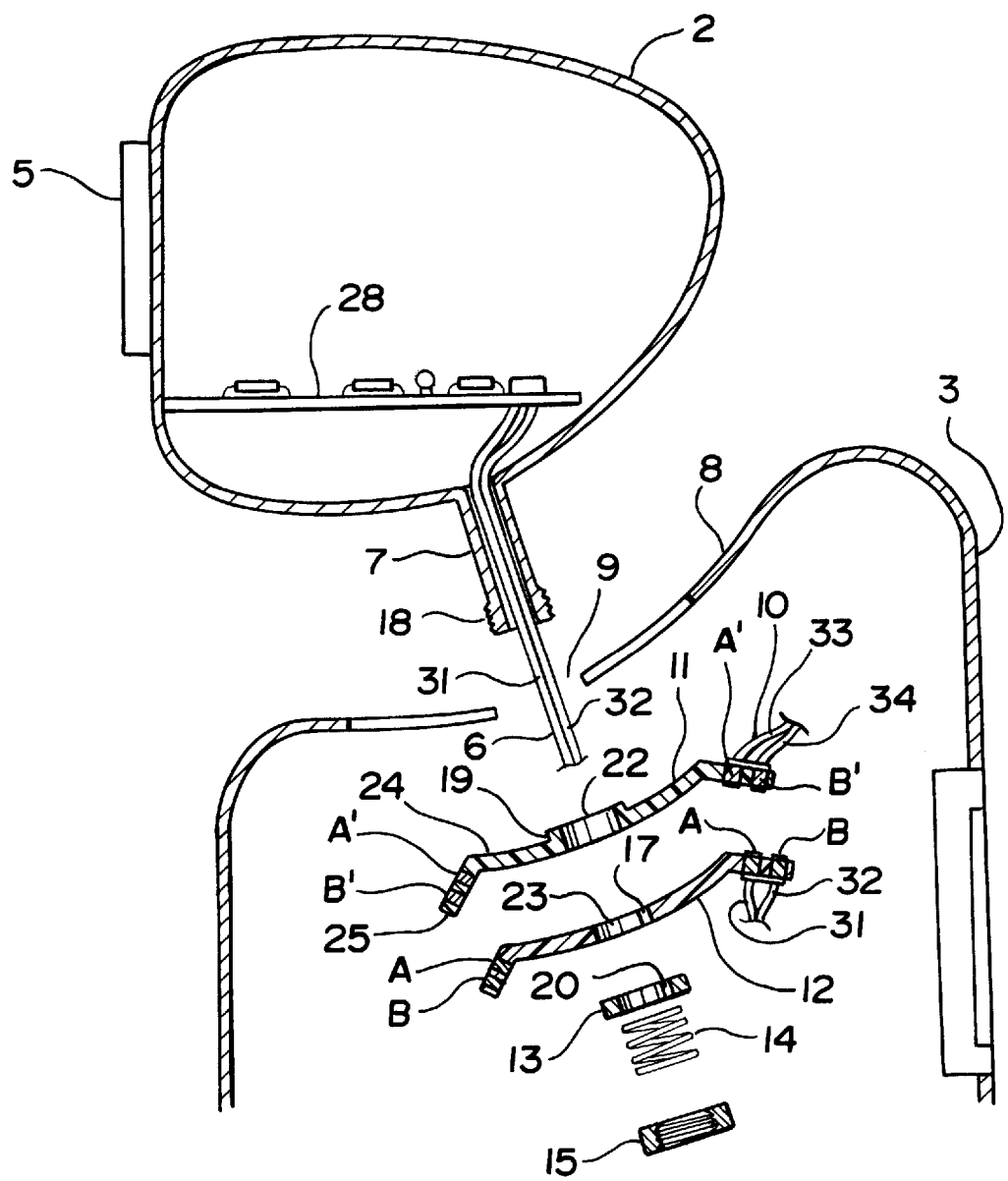
FIG. 5 is a cross-sectional side view corresponding to that of FIG. 4, but with the parts shown in a disassembled state for clarity.
Figure 6:
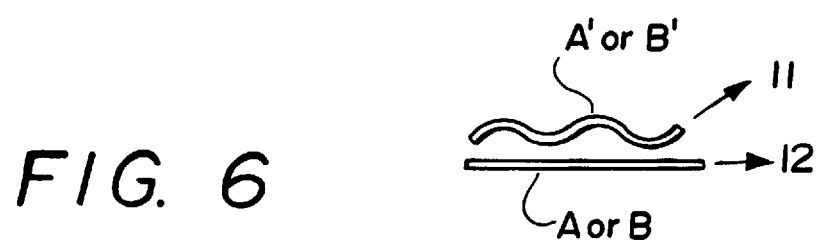
FIG. 6 is a schematic diagram of an alternative arrangement for a pair of conductive rings used in the preferred embodiment of the invention.

As illustrated in FIGS. 3–5, a first electrical cable 6 having at least two wires therein extends from circuit board 28 in the lens assembly 2 and is surrounded by a rotatable tube 7. Tube 7 can be fastened to the housing of the lens assembly 2 or formed integrally therewith but in any case is arranged to move with the lens assembly. A longitudinal groove 16 and an externally threaded portion 18 are formed at a lower end of the round tube 7.

Tube 7 extends through first plate 11 and second plate 12. The first plate 11 has a circular opening 22 at its center and a square-shaped projection 19 surrounding the circular opening. At least two generally concentric rings $A^1, B^1$ respectively connected to the at least two wires of cable 6 are arranged on the first plate 11 to electrically contact a corresponding two generally concentric rings A,B on the second plate 12 and thereby connected the at least two wires 31,32 of the cable 6 with at least two wires 33,34 of a cable 10 connected to respective rings A and B of the second plate 12, cable 10 in turn extending into the main body 3.

First and second plates 11 and 12 are preferably formed of an electrically insulative material while rings $A,B,A^1,B^1$ are formed of an electrically conductive material and may be embedded in their respective plates 11 and 12 with upper and lower surfaces of rings $A,B,A^1,B^1$ being exposed and preferably protruding slightly from the plates to facilitate connection of the respective wires 31,32 to the lower surfaces of rings A,B and wires 33,34 to the upper surfaces of rings $A^1,B^1$, and to ensure electrical contact between the upper surfaces of rings A,B and the lower surfaces of rings $A^1,B^1$. As illustrated, plates 11 and 12 have center portions 24,24' whose shapes match that of concave face 8, and rims 25,25' extending at an angle to the center portions on which the conductive rings are situated to provide clearance relative to the main body 3 for the wires 33,34 connected to plate 11, as illustrated in FIGS. 3–5.

In an alternative version of this embodiment of the invention, instead of being embedded in the plates 11 and 12, rings $A,B,A^1,B^1$ can be in the form of pairs of annular electrically conductive elements attached to the upper and lower surfaces of plates 11 and 12 and electrically connected to each other through the plates.

A circular opening 23 is formed in the center of plate 12, with a detent 17 extending radially into the circular opening for engaging groove 18 in the tube 7 to cause plate 12 to rotate with tube 7 after being fitted over the tube and secured thereto by a nut 15 threaded onto the threaded portion of tube 7, a lock washer 13 provided with a detent 20 so that the lock washer also rotates with tube, and a coil spring 14 surrounding the tube and provided between the nut and the washer to press plate 12 against plate 11 and thereby ensure a good electrical contact. The square-shaped projection 19 is received by the central portion of slot 9 such that edges of the projection engage edges of the slot so that plate 11 is prevented from rotating relative to main body 3 but is free to translate in a direction of the slot.

In an alternative embodiment of the invention, illustrated in FIG. 5, good contact between the conductive rings on plates 11 and 12 is ensured by forming the conductive rings of at least one of the plates from a resilient conductive material such as brass and giving the rings a wave shape. This arrangement can replace the coil spring of the embodiment illustrated in FIGS. 3 and 4, with the means for securing the second plate on the tube, i.e., a nut threaded onto the tube, and the detent and groove arrangement for preventing relative rotation between the detent and groove being otherwise the same as described in connection with the embodiment of FIGS. 2–4.

It will be appreciated by those skilled in the art that the number of rings for each plate will depend on the number of wires in the electrical cables to be connected. With this arrangement, no matter how the lens assembly is rotated, the second plate 12 rotates with the assembly and thus the cables 10 and 12 cannot become entangled and electrical signals can be reliably transmitted thereby. While 360° rotation is believed to be especially advantageous, however, those skilled in the art will appreciate that the invention can also be advantageously used for mounting in which less than 360° rotation is required, in which case the rings $A,B,A^1,B^1$ need not extend 360° around the plates.

By providing a cross-shaped slot 9 in the main body 3, the lens assembly can be pushed in either the left-right direction or the forward-backward direction, i.e., about the x or y axes, while still permitting 360° rotation about the vertical or z axis. In the case of movement in the left-right or forward-backward directions, the square projection does not impede movement of plate 11 and thus tube 7, first plate 11, second plate 12, stopper washer 13, spring 14, and nut 12 all translate together in a selected slot direction, while in the case of rotation about the vertical axis, plate 11 is prevented from rotation with only tube 7, second plate 12, stopper washer 13, spring 14, and nut 15 being rotated together with the shutter assembly.

Having thus described a preferred embodiment of the invention in sufficient detail to enable those skilled in the art to make and use the invention, it is nevertheless intended that the above description not be taken as limiting, but rather that the invention be defined solely by the appended claims.

I claim:

1. A moving mechanism for a camera lens assembly, comprising:

a smooth concave face formed in a surface of a main body of a camera and having a slot extending through the surface;

a tube extending through the slot and arranged to rotate with the lens assembly;

a first cable including at least two wires extending from the lens assembly through the tube;

a first plate including at least two conductive rings connected respectively to the at least two wires of the first cable;

a second plate including at least two conductive rings connected respectively to two wires extending into the main body of the camera and arranged to electrically contact the at least two conductive rings of the first plate to thereby electrically connected the at least two wires of the first cable to the at least two wires of the second cable;

first means for causing the first plate to rotate with the tube as the tube is rotated in the slot and to translate with the tube as the tube is translated in the slot; and second means on the second plate for preventing the second plate from rotating relative to the main body of the camera as the tube is rotated in the slot while permitting the second plate to move with the first plate as the tube is translated in the slot, whereby the lens assembly can be rotated about a horizontal axis by rotating the lens assembly so that the tube translates relative to the slot while maintaining electrical contact between respective ones of the two conductive rings on each plate, and the lens assembly can also be rotated about a vertical axis by rotating the tube and first plate relative to the second plate without entangling the respective cables.

2. A moving mechanism as claimed in claim 1, wherein said slot has a cross-shape and the tube can be translated in either of two directions defined by the slot to permit the lens assembly to be rotated about either of two horizontal axes.

3. A moving mechanism as claimed in claim 1, wherein the first means comprises an axial groove in the tube and a detent extending into a central opening of the plate to engage the groove and thereby cause the first plate to rotate with the tube.

4. A moving mechanism as claimed in claim 1, wherein the second means comprises a square projection extending from the second plate to engage sides of the slot and thereby prevent the second plate from rotating relative to the slot which permitting translation in the slot.

5. A moving mechanism as claimed in claim 1, further comprising means for securing the second plate to the tube and biasing the second plate against the first plate in order to ensure good electrical contact between the conductive rings of the first and second plates.

6. A moving mechanism as claimed in claim 5, wherein the second plate securing and biasing means comprises a coil spring positioned between a nut threaded onto an end of the tube and a washer positioned against the second plate.

7. A moving mechanism as claimed in claim 1, wherein the conductive rings of the second plate are made of a resilient material and formed to have a wavy shape to thereby ensure good electrical contact between the conductive rings of the first and second plates when the second plate is secured on the tube.

* * * * *